(No Model.)
C. F. PIKE.
FLEXIBLE BRUSH FOR CLEANSING WATER CLOSETS, &c.
No. 270,979. Patented Jan. 23, 1883.
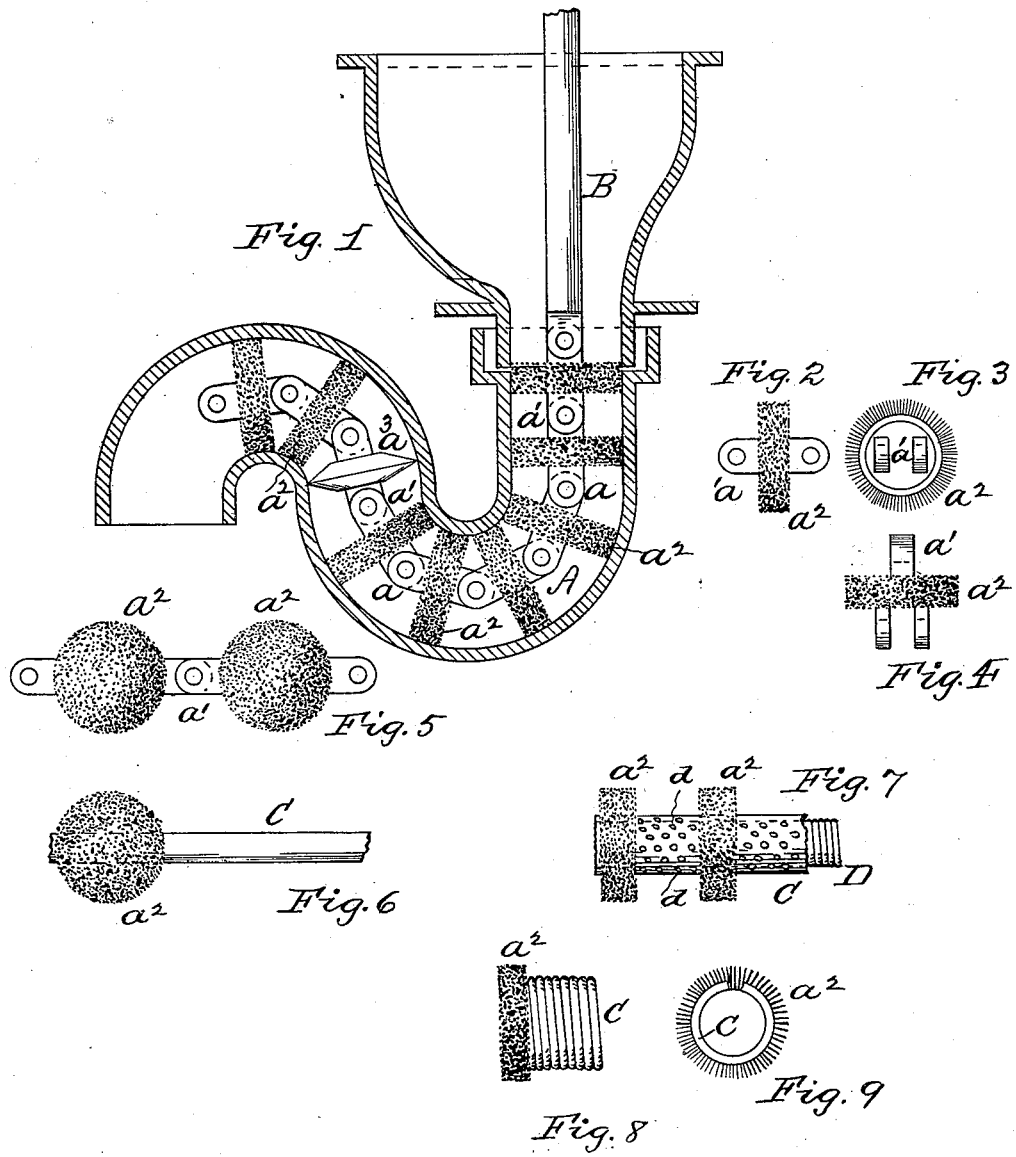

UNITED STATES PATENT OFFICE.

CHARLES F. PIKE, OF PHILADELPHIA, PENNSYLVANIA, ASSIGNOR TO THE NATIONAL ANTI-SEWER GAS COMPANY, OF CAMDEN, NEW JERSEY.

FLEXIBLE BRUSH FOR CLEANSING WATER-CLOSETS, &c.

SPECIFICATION forming part of Letters Patent No. 270,979, dated January 23, 1883.

Application filed July 27, 1882. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Flexible Brushes for Cleansing Water-Closets, &c., of which the following is a specification, reference being had therein to the accompanying drawings, wherein—

Figure 1 is a section of a water-closet and trap illustrating the application of my improved brush for cleansing the same, the latter being shown in elevation. Figs. 2, 3, and 4 are detailed views of the brush. Fig. 5 is a plan of a modification. Fig. 6 is a like view of another modification, and Figs. 7, 8, and 9 show still further modifications.

My invention has for its object to provide a flexible brush for cleansing the traps of water-closets, wash-basins, and other similar articles; and it consists in the provision of a flexible rod or shaft, to which the brushes are attached, so that when inserted into a trap the brush will readily conform to the outline thereof in order that the trap may be thoroughly and quickly cleansed.

Referring to the accompanying drawings, A represents a brush composed of a flexible shaft, $a$, which is formed by hinging or loosely connecting together a series of links, $a'$, each of which carries a brush, $a^2$. The latter may be in the form of a disk, as shown in Fig. 1, or may have the configuration of a ball, as shown in Figs. 5 and 6. To said brush A is attached a rod or handle, B, for operating the same within the trap to remove fecal or other matter from the sides thereof.

If desired, one or more or every alternate link $a'$ may have a scraper, $a^3$, attached thereto, instead of the brush $a^2$, as shown at Fig. 1. So,'too, the links $a'$ may be dispensed with, and a rubber or other flexible tube, C, used in lieu thereof, to which the balls or brushes $a^2$ are secured, as shown in Fig. 6, and, if desired, a spring or coiled wire, D, may be placed within said tube, as shown in Fig. 7. Said tube may be perforated, as shown at $d$, to permit a stream of water to be passed therethrough, when the brush A is inserted into the trap, to wash out thereof the dirt, &c., scraped or cleansed from its walls during the cleansing operation. Again, both the tube C and links $a'$ may be dispensed with and the coiled wire D only be used, to which the brushes $a^2$ are secured in any suitable manner, as shown in Figs. 8 and 9. It will therefore be noticed that various forms or constructions of shaft or core may be employed for the brush; but it is essential, however, that the shaft should be not only flexible enough to permit its insertion into the trap, so as to conform thereto, but it should be more or less rigid, so that it will hold the brushes in impingement with the walls of the trap and cause a simultaneous movement of all of them when manipulated to effect a thorough cleansing of the trap.

What I claim as my invention is—

1. A brush for removing the incrustation from water-closet traps, which consists of a shaft or core provided with circular brushes or circular rows of bristles, said shaft being adapted to conform to the outline of the trap, and yet possess sufficient rigidity to cause all of the brushes to simultaneously operate to effect such removal, substantially as set forth.

2. A brush for cleansing water-closet traps, which consists of a shaft or core provided with a series of brushes and a scraper, said shaft being adapted to conform to the outline of the trap, yet having sufficient rigidity to cause the brushes and scraper to simultaneously operate to effect such cleansing, substantially as set forth.

In testimony whereof I affix my signature in presence of two witnesses.

CHARLES F. PIKE.

Witnesses:
CHAS. F. VAN HORN,
S. J. VAN STAVOREN.